R. R. JAMES.
FLYING MACHINE.
APPLICATION FILED JULY 27, 1912.
1,195,139.
Patented Aug. 15, 1916.
5 SHEETS—SHEET 4.
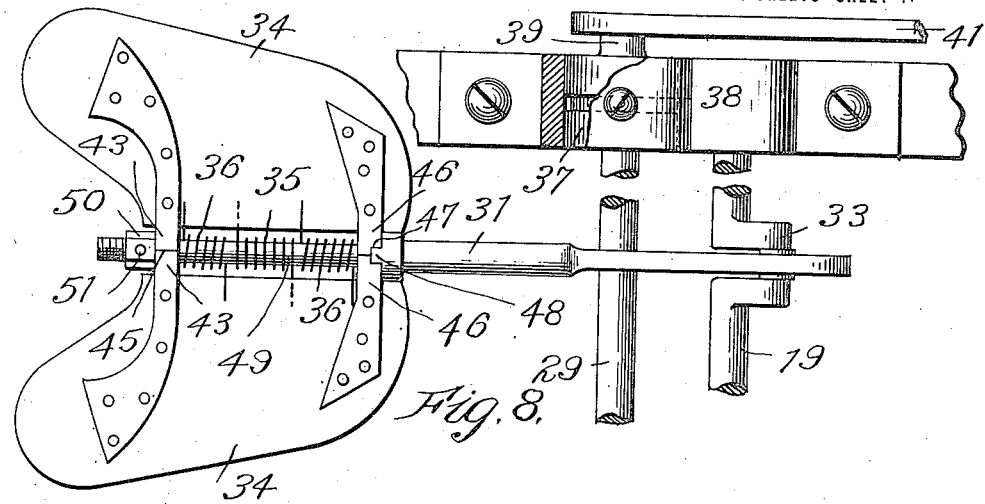
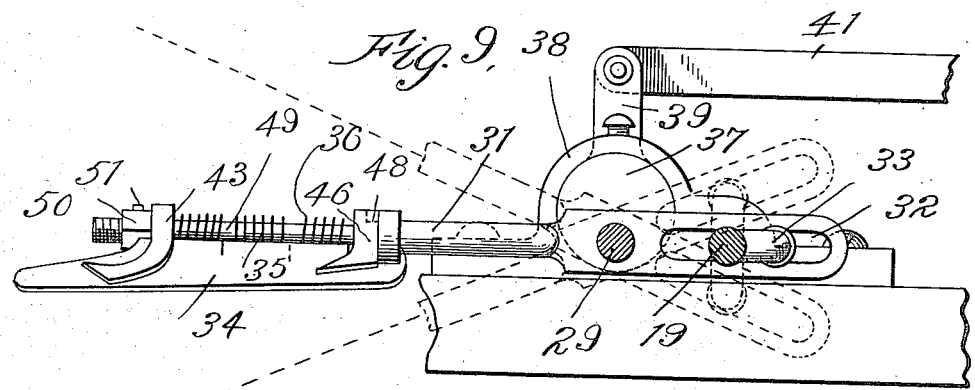
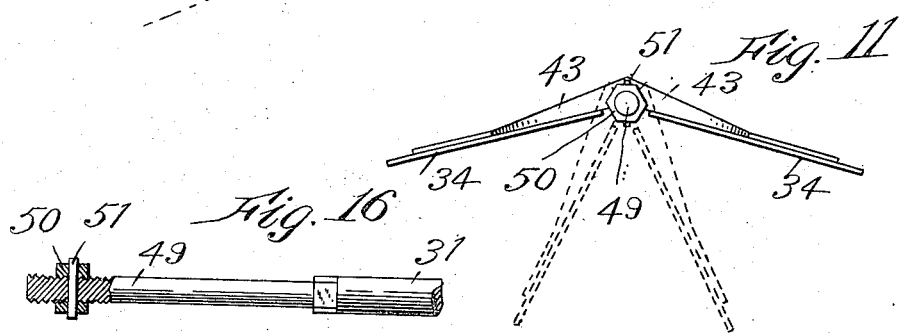
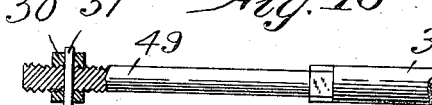
Witnesses:
Richard R. James
Inventor
By his Attorneys R. R. JAMES.
FLYING MACHINE.
APPLICATION FILED JULY 27, 1912.
1,195,139.
Patented Aug. 15, 1916.
5 SHEETS—SHEET 5.
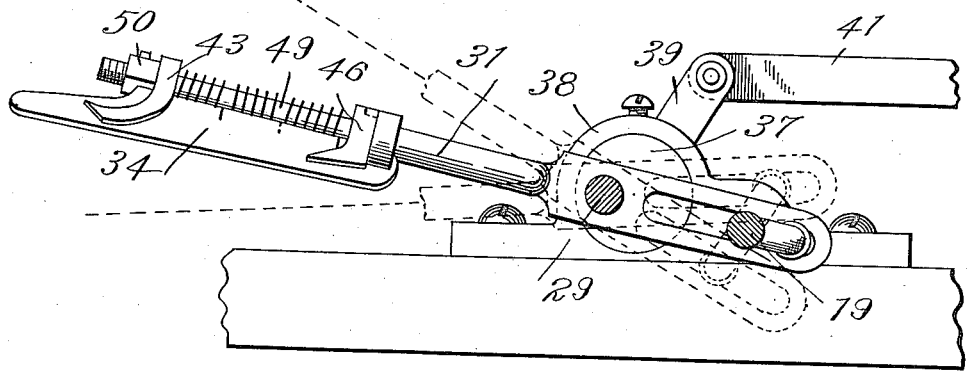
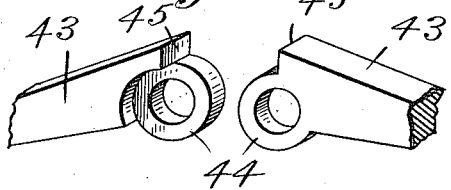
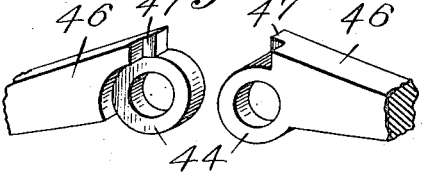
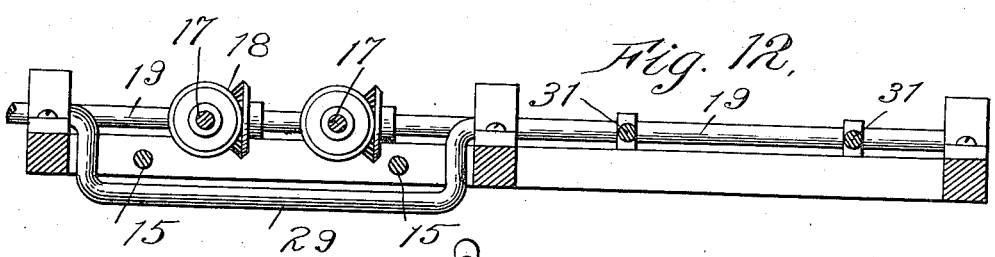
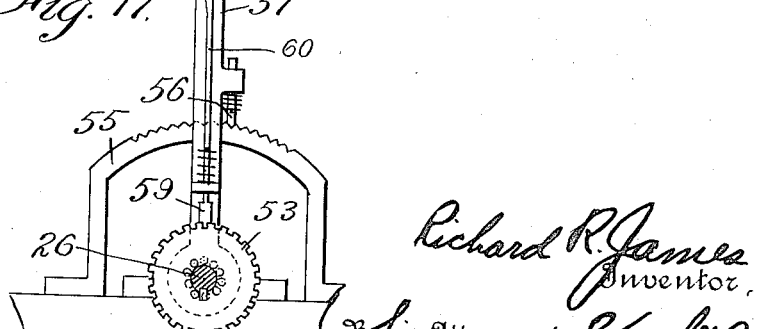

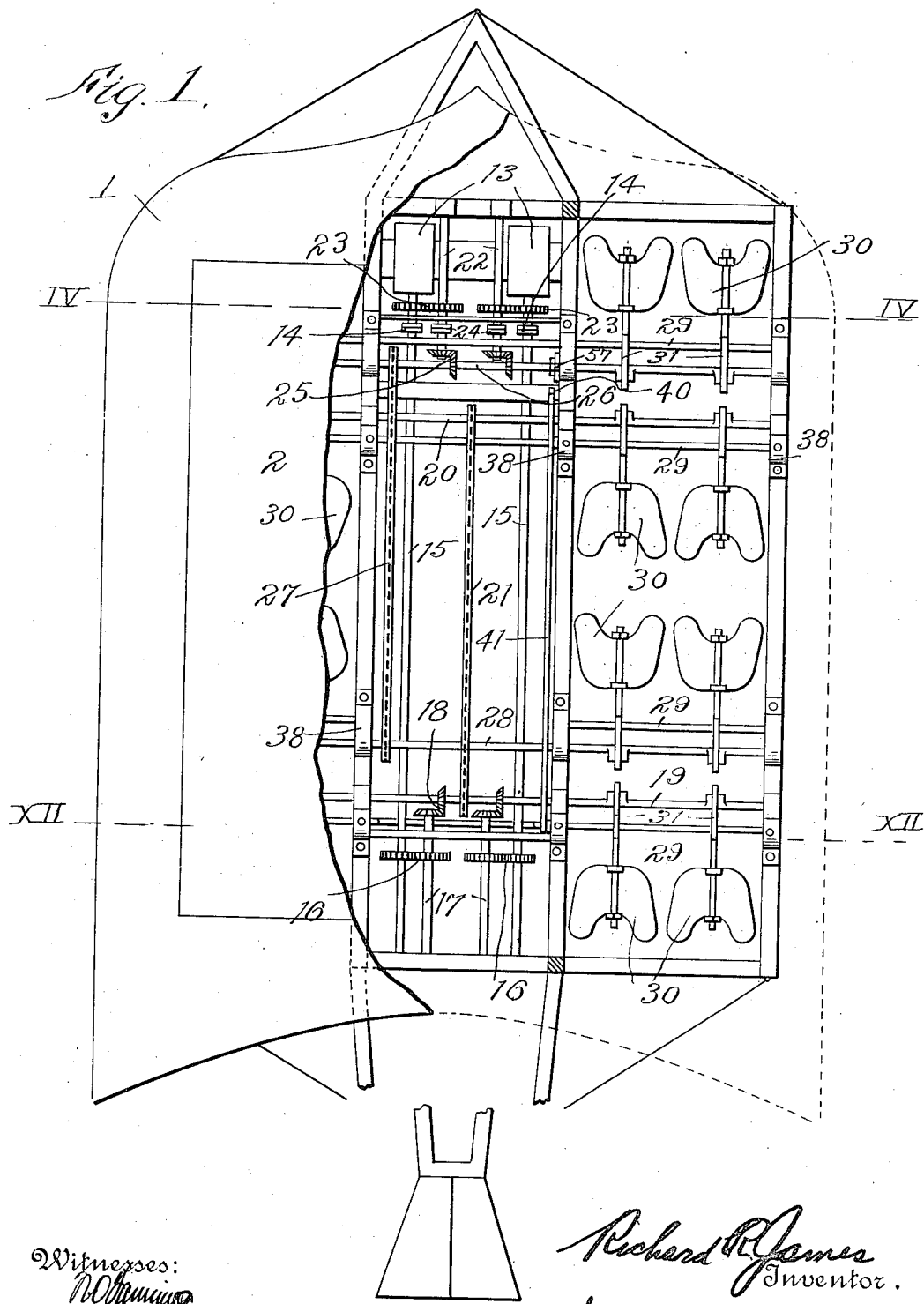

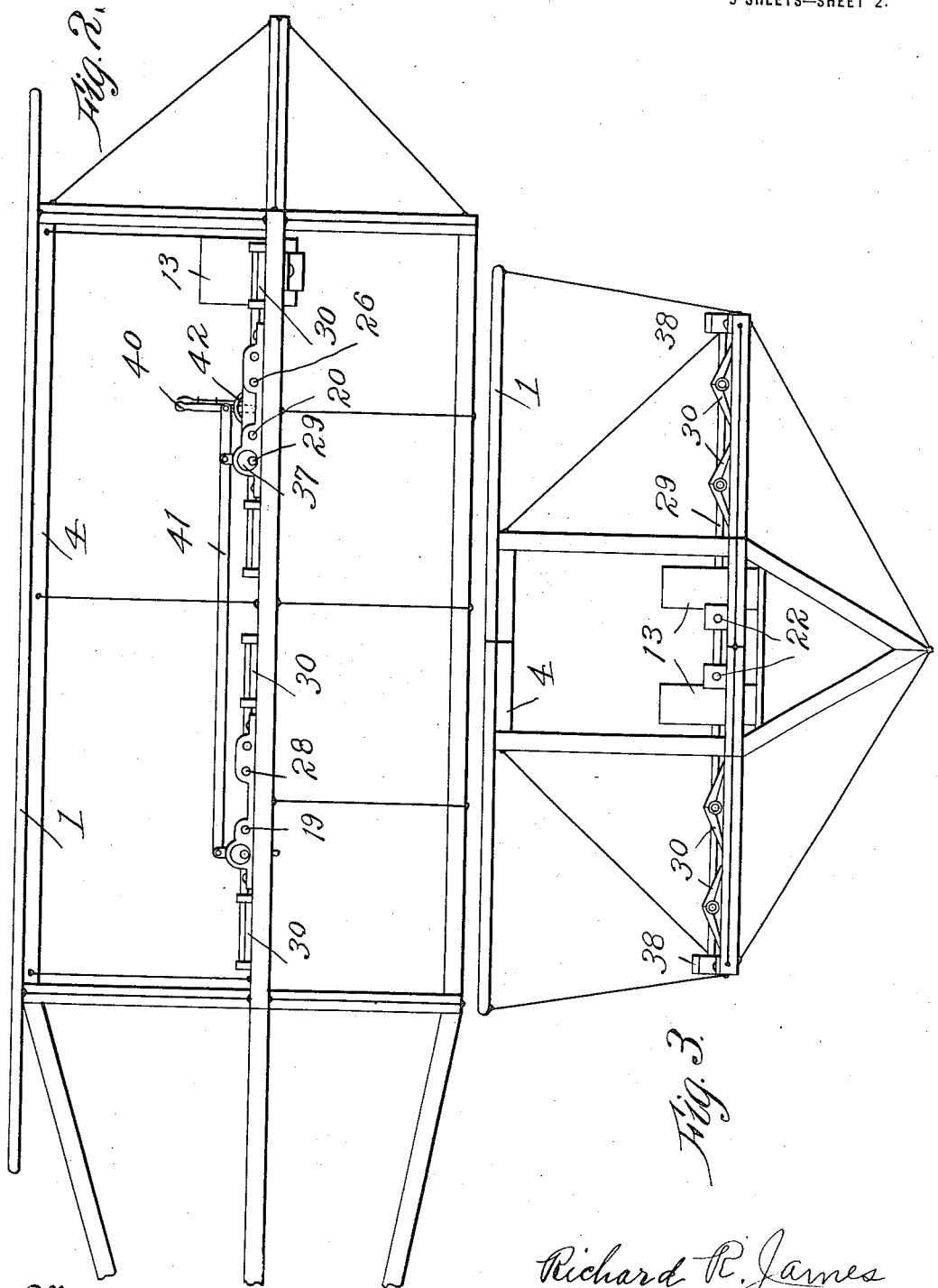

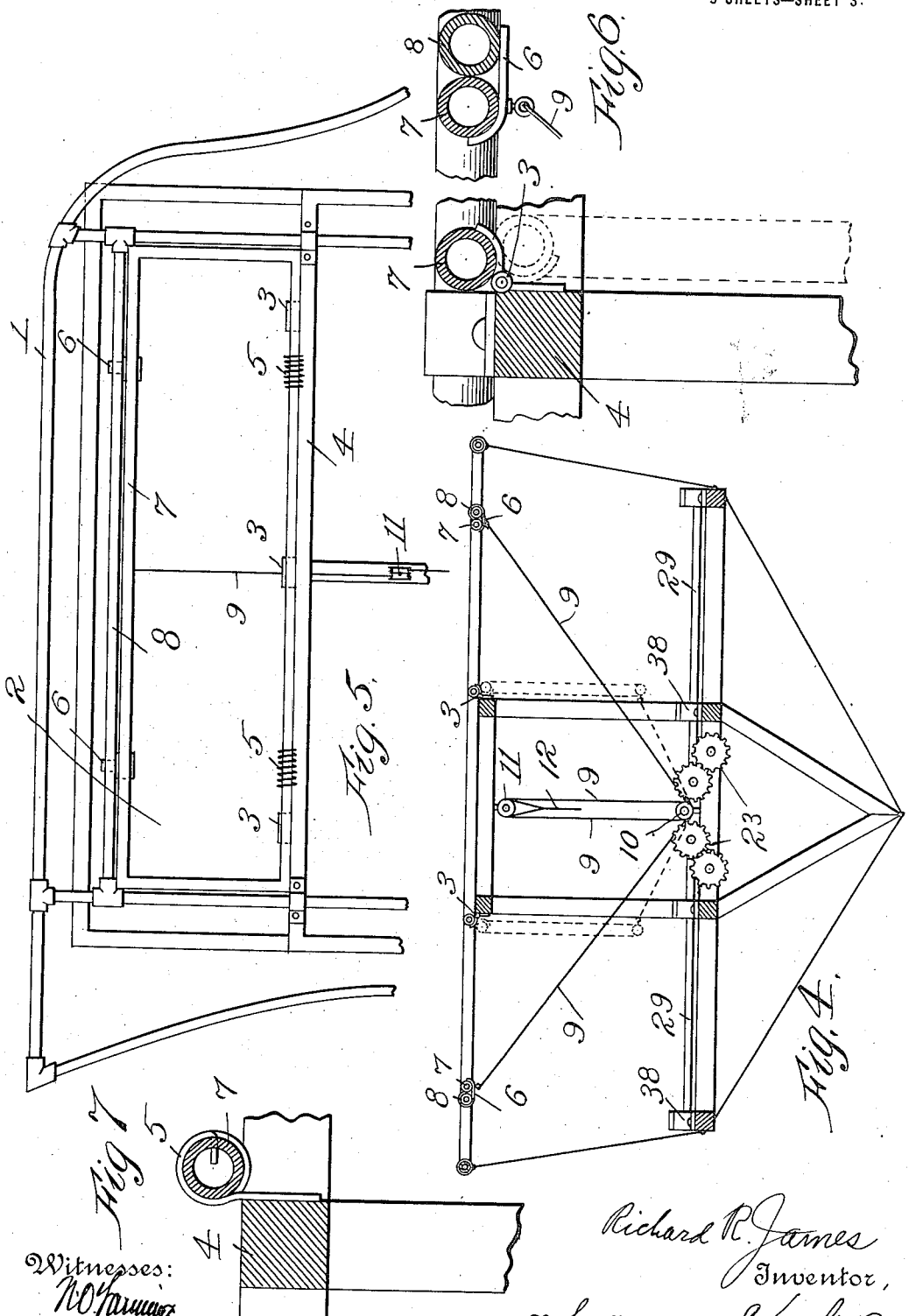

UNITED STATES PATENT OFFICE.

RICHARD R. JAMES, OF BROOKLYN, NEW YORK.

FLYING-MACHINE.

1,195,139.   Specification of Letters Patent.   Patented Aug. 15, 1916.

Application filed July 27, 1912. Serial No. 711,843.

*To all whom it may concern:*

Be it known that I, RICHARD R. JAMES, a citizen of the United States, residing at Brooklyn, in the county of Kings, State of New York, have invented certain new and useful Improvements in Flying-Machines, of which the following is a specification.

My invention relates to flying machines which embody wings that are movable vertically for lifting and propelling said machine and which are suitably mounted to adapt them to change the directions in which the propelling effort is exerted.

The primary object of this invention is to provide an improved construction, combination, and arrangement of parts in a device of this character in which the wings are adapted to hold the air on one stroke and to release the air on the opposite stroke.
One of the objects of my invention is to provide improved means for mounting the wings whereby their angular dispositions on the machine can be modified at will to adapt them to alter the course of the machine.

Another object is to provide a plurality of groups of wings in which each group is adapted to exert a propulsion in a different direction from that of the other groups. A further object is to provide improved means whereby these groups can be operated in various combinations for effecting different resultant movements of the machine.

Other and further objects will appear in the specification and will be specifically pointed out in the appended claims, reference being had to the accompanying drawings exemplifying the invention and in which, Figure 1 is a top plan view of a flying machine constructed in accordance with the principles of the present invention, portions of the top plane being broken away to show up portions of the machine therebeneath; Fig. 2 is a side elevation of the same; Fig. 3 is a front elevation of the same; Fig. 4 is a section on the line IV—IV of the Fig. 1. Fig. 5 is a fragmentary top plan view of the upper frame work of the machine. Fig. 6 is an enlarged fragmentary section showing details of the same. Fig. 7 is an enlarged detailed fragmentary section showing the means for cushioning the movements of the movable plane sections. Fig. 8 is an enlarged fragmentary top plan view of one of the propelling wings and operating mechanism therefor, parts being broken away and parts shown in section. Fig. 9 is a side elevation of the same. Fig. 10 is a view similar to Fig. 9 showing the parts in different positions. Fig. 11 is an end elevation of one of the wings. Fig. 12 is a transverse section on the line XII—XII in Fig. 1. Figs. 13, 14, 15 are fragmentary details to be hereinafter referred to. Fig. 16 is a fragmentary detail of one of the rocking wing bars, parts being shown in section. Fig. 17 is a detail elevation of wing locking mechanism, the crank shaft being shown in section.

Referring more particularly to the drawings, the top plane 1 is provided in the present arrangement with a pair of oppositely disposed revoluble sections 2 which as shown in Figs. 4, 5 and 6 are hinged at 3 to a longitudinal bar 4 of the top frame work, springs 5 being provided to impart normal tendency to maintain the plane sections 2 in closed position, suitable locking means (not shown) being provided to prevent said sections being closed under the pressure of downward currents. The outer edges of the swinging sections 2 are provided with stops 6 rigidly mounted on the outer bars 7 of the sections 2, said stops being adapted to abut against a fixed bar 8 for retaining the sections 2 against displacement above the top planes of which they form component parts. Secured to the outer edges of the sections 2 are operating cords 9 which lead inwardly to guide pulleys 10 which guide them to upper guide pulleys 11, the cords 9 being united at 12 into a single lead. By means of the cords 9, and lead 12, said sections 2 can be drawn into the positions shown in dotted lines in Fig. 4, or into positions intermediate to that and closed position, thereby making it possible to vary the plane area of the top plane to modify the rising and falling movements of the ship.

As shown in Fig. 1, the present arrangement of my invention contemplates a pair of power generating units 13 each being releasably connected by the clutch 14 with a shaft 15. A geared connection 16 at the rear end of the machine serves to operate a jack shaft 17 which transmits power through beveled gear 18 to a transverse shaft 19 which is adapted to drive a similar transverse shaft 20 in the forward end of the machine by means of a sprocket chain 21. Adjacent each of the motors 13 is a jack shaft 22 connected to the motor by gears 23. A clutch 24 connects each jack shaft 22 through the agency of beveled gears 25, with a transverse shaft 26, a sprocket chain 27 operatably connecting a rear transverse shaft 28 to the forward shaft 26. Adjacent each of the transverse shafts 19, 20, 26 and 28, is a rock or oscillatory shaft 29 upon which a plurality of propelling wings 30 are oscillably mounted by means of rock bars 31. As shown best in Figs. 9 and 10, each of the rock bars 31 is provided with a slot 32 within which operates a crank 33 forming integral portions of the shafts 19, 20, 25, 28 respectively. The general arrangement shown in Fig. 1, makes it possible to operate all of the crank shafts from either of the motors 13, or by means of the gear clutches 14 and 24, it is possible to operate said wings in various groups in such a manner as to counterbalance the propelling efforts tending to impart forward and backward movements, or if desired only those wings which tend to impart forward movement may be operated solely, or only those wings which tend to impart a rearward movement during the operation of the wings to effect an ascension of the machine.

The detail construction of the wings and means for operating the same is shown best in Figs. 8, 9 and 10. Each wing comprises the collapsible sections 34 which, when a wing is moving upward are folded toward each other by the pressure of the air. In order to cushion the downward movement of the sections 34 a spring 35 is mounted adjacent the outer end of each rock bar 31, while for the purpose of cushioning the upward movement of the sections during downward displacement of the wings, a pair of springs 36 are provided to prevent an excessive shock to the parts when they are thrown into the position shown in full lines in the drawings. In order to provide simple and efficient means for modifying the relative disposition of each rock shaft 29 with respect to the crank shaft which operates the corresponding rock bar 31, said rock shaft is carried by an eccentric 37 mounted in a fixed sleeve 38. A lever arm 39 fixed to the eccentric 37 is connected to a shifting lever 40 by means of a connecting rod 41, see Fig. 2. The shifting lever 40 is provided with suitable interlocking dog and segment 42 for retaining it in any position to which it may be adjusted. As details of construction may be mentioned means for suitably mounting the wing sections 34 upon their respective rock bars 31. According to the present embodiment the outer ends of the wings are provided with cleats or ribs 43 whose inner ends are provided with complementary bearing collars 44 provided with oppositely disposed abutments 45 to prevent displacement above the top plane. The cleats 46 at the inner ends of the wings are similarly constructed but in addition are provided with registering recesses 47 which interlock with a flattened projection 48 (see Fig. 8) carried by the rock bar 31, the purpose of this device being to insure the proper angular arrangement of the wing section at all times. The reduced outer end portion 49 of rock bars 31 upon which the sections 34 are journaled, is threaded on its outer end to receive a retaining nut 50 which is locked in position by a set pin 51.

Whenever it becomes desirable to throw out any group of wings, said wings must be locked in position and means provided for adjusting this locked position to correspond with the direction in which the machine is moving. For this purpose, any suitable means may be employed, an illustration of the same shown on the drawings comprising a toothed wheel 53 keyed to each of the operating crank shafts 19, 20, 26 and 28, only one of these devices being visible in Fig. 1 of the drawings, the others being hidden from view by parts of the mechanism thereabove. Rigidly secured to the adjacent longitudinal bar 54 of the machine framework is a toothed segment 55 which is suitably disposed to coöperate with a dog or pawl 56 which is resiliently mounted on a hand lever 57 which may be mounted in any suitable manner to swing about an axis approximately coincident with the axis of the crank shaft 26. Preferably, the hand lever 57 is freely journaled on the crank shaft 26, for which purpose the ball bearings 58 may be advantageously employed. Releasably engaging the teeth of the toothed wheel 53, is a locking dog 59 which is pivotally connected to a draw rod 60 actuated by a spring pressed hand grip 61. When, therefore it is desired to throw out the wings actuated by any of the crank shafts, the clutch for transmitting power thereto, is released after which the dog 59 is thrown into engagement with the toothed wheel 53 and the wing 30 adjusted to the desired position in which it is locked.

What I claim is:

1. In a flying machine, a plurality of fixed sleeves coaxially mounted with respect to a line extending transversely across said machine, eccentrics journaled in said sleeves, a shaft carried by said eccentrics, means for oscillating said eccentrics to adjust the position of said shaft, a wing bar mounted on said shaft, a propelling wing carried by said wing bar, and means for oscillating said wing bar.

2. In a flying machine, the combination with a shaft, of an oscillatable wing-supporting bar carried thereby an air displacing wing carried by said bar and means for shifting the position of said shaft said means comprising an eccentric mounting for said shaft.

3. In a flying machine, the combination with an eccentric, of a shaft projecting from said eccentric, and a wing operating bar mounted on said shaft.

4. In a flying machine, the combination with an eccentric, of a shaft carried by said eccentric, a rock bar mounted intermediately of its ends on said shaft, a propelling wing carried by one end of said rock bar, and driving means operatably connected to the other end of said rock bar, said eccentric being adapted to change the line of action of said propelling wing.

5. In a flying machine, a wing bar, a shaft about which said wing bar is oscillatable, means for moving said shaft into successive parallel positions, wing sections journaled on the outer end of said wing bar, said sections being provided with hub portions with shoulders adapted to be brought into rigid abutment with each other during the movement of said wing bar in one direction, and means yieldably retaining said shoulders in abutment to permit their collapse when the wing bar is moved in the opposite direction.

6. In a flying machine, a wing bar, a shaft about which said wing bar is oscillatable, means for moving said shaft into successive parallel positions, wing sections journaled on the outer end of said wing bar, said sections being provided with hub portions with shoulders adapted to be brought into rigid abutment with each other during the movement of said wing bar in one direction, and means yieldably retaining said shoulders in abutment to permit their collapse when the wing bar is moved in the opposite direction, said wing bar being provided with a slotted inner end, and a crank pin movable around a fixed center and slidably engaging said slotted end.

7. In a flying machine, a plurality of substantially parallel shafts extending transversely of the direction of flight of said machine, means for adjusting the axes of said shafts simultaneously and into parallel positions, oscillatory wing bars carried by said shafts and extending lengthwise in the direction of flight of said machine, wings mounted on the forwardly extending ends of some of said wing bars, and wings mounted on the rearwardly extending ends of others of said wing bars.

8. In a flying machine, a plurality of substantially parallel shafts extending transversely of the direction of flight of said machine, means for adjusting the axes of said shafts simultaneously and into parallel positions, oscillatory wing bars carried by said shafts and extending lengthwise in the direction of flight of said machine, wings mounted on the forwardly extending ends of some of said wing bars, wings mounted on the rearwardly extending ends of others of said wing bars, a crank shaft for driving all the wing bars on each cross shaft, and means for rotating said crank shafts.

9. In a flying machine, a plurality of substantially parallel shafts extending transversely of the direction of flight of said machine, means for adjusting the axes of said shafts simultaneously and into parallel positions, oscillatory wing bars carried by said shafts and extending lengthwise in the direction of flight of said machine, wings mounted on the forwardly extending ends of some of said wing bars, wings mounted on the rearwardly extending ends of others of said wing bars, a crank shaft for driving all the wing bars on each cross shaft, and means for rotating said crank shafts, said rotating means comprising a plurality of engines mounted on said machine and means for separately connecting each of said engines with each of said crank shafts.

10. In a flying machine, the combination of crank shafts extending transversely of said machine, of a plurality of propelling wings oscillatable about axes parallel to said crank shafts, said wings being operatively connected to said crank shafts and adapted to displace the air in opposite directions toward the front and rear respectively of said machine, and means adapting said crank shafts to be operated separately and in groups to modify the course of the machine.

11. In a flying machine, a plurality of substantially parallel shafts extending transversely of the direction of flight of said machine, means for adjusting the axes of said shafts simultaneously and into parallel positions, oscillatory wing bars carried by said shafts and extending lengthwise in the direction of flight of said machine, wings mounted on the forwardly extending ends of some of said wing bars, wings mounted on the rearwardly extending ends of others of said wing bars, and means for driving said wing bars in groups.

12. In a flying machine, the combination with a top aeroplane, of a plurality of forwardly presented wings suitably mounted to oscillate on one or more axes extending transversely to the line of flight of said machine and below said aeroplane, a plurality of rearwardly presented wings suitably mounted to oscillate on one or more axes extending transversely to said line of flight and below said aeroplane, and means for oscillating all of said wings.

13. In a flying machine, the combination with a top aeroplane, of a plurality of forwardly presented wings suitably mounted to oscillate on one or more axes extending transversely to the line of flight of said machine and below said aeroplane, a plurality of rearwardly presented wings suitably mounted to oscillate on one or more axes extending transversely to said line of flight and below said aeroplane, and means for oscillating all of said wings, said oscillating means being adapted to operate the forwardly presented wings independently of the rearwardly presented wings.

14. In a flying machine, the combination with a top aeroplane, of a plurality of forwardly presented wings suitably mounted to oscillate on one or more axes extending transversely to the line of flight of said machine and below said aeroplane, a plurality of rearwardly presented wings suitably mounted to oscillate on one or more axes extending transversely to said line of flight and below said aeroplane, and means for oscillating all of said wings, said oscillating means being adapted to operate the rearwardly presented wings independently of the forwardly presented wings.

15. In a flying machine, the combination with a top aeroplane, of a plurality of forwardly presented wings suitably mounted to oscillate on one or more axes extending transversely to the line of flight of said machine and below said aeroplane, a plurality of rearwardly presented wings suitably mounted to oscillate on one or more axes extending transversely to said line of flight and below said aeroplane, and means for oscillating all of said wings, said oscillating means being adapted to simultaneously operate the same number of rearwardly and forwardly presented wings.

In testimony whereof, I affix my name to this specification in the presence of two witnesses.

RICHARD R. JAMES.

Witnesses:
Wm. E. Knight,
M. G. Crawford.